May 13, 1958 L. A. PETERMANN 2,834,158
ULTRASONIC DRILL
Filed Jan. 28, 1955 4 Sheets-Sheet 1
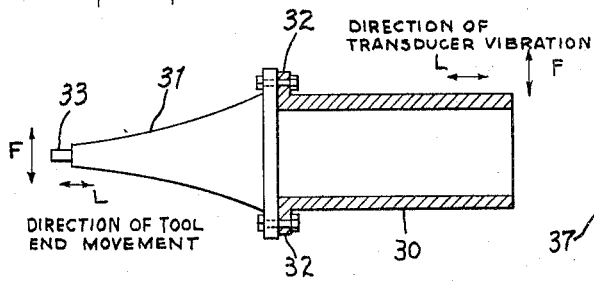
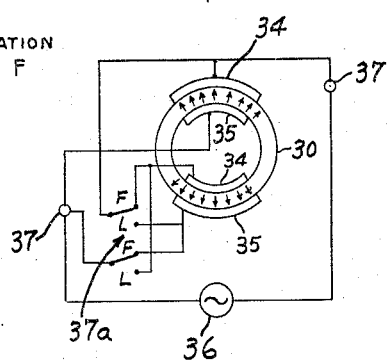
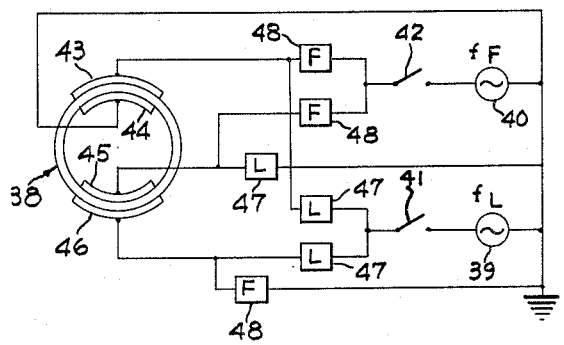
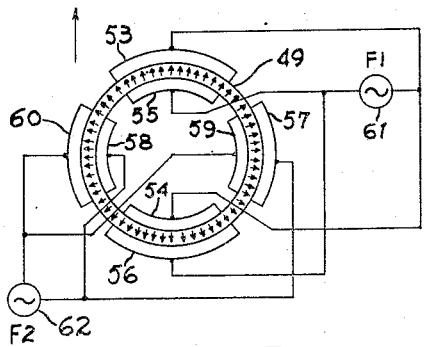
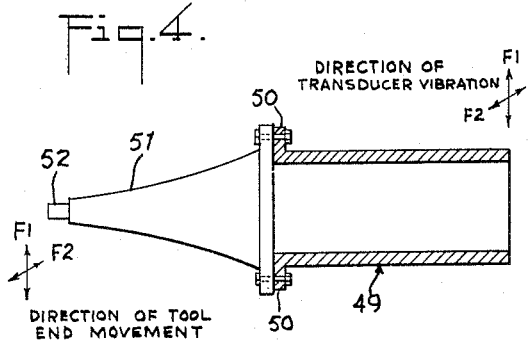
INVENTOR.
LUCIEN A. PETERMANN
BY Cyrus D. Samuelson
ATTORNEY May 13, 1958 L. A. PETERMANN 2,834,158
ULTRASONIC DRILL
Filed Jan. 28, 1955 4 Sheets-Sheet 2
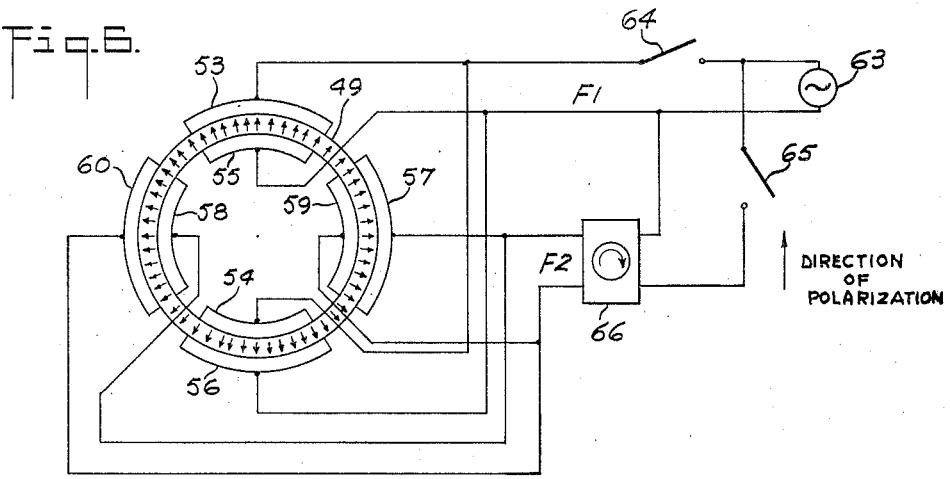
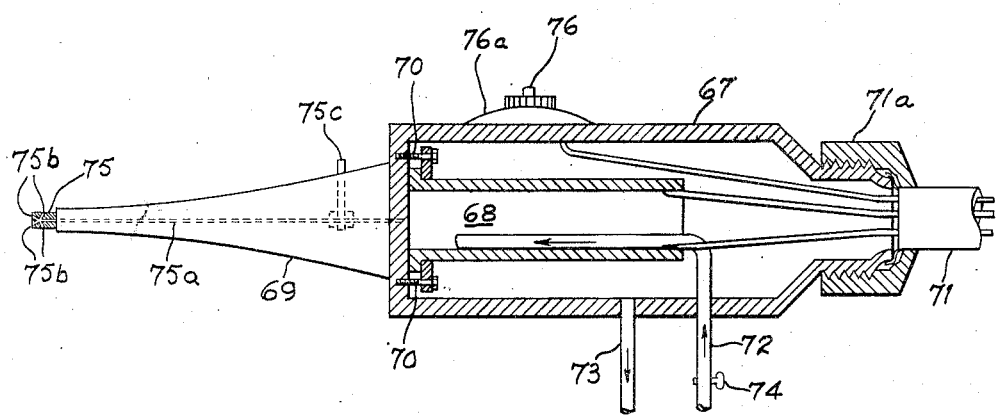
INVENTOR.
LUCIEN A. PETERMANN
BY Cyrus D. Samuelson
ATTORNEY May 13, 1958 L. A. PETERMANN 2,834,158
ULTRASONIC DRILL
Filed Jan. 28, 1955 4 Sheets-Sheet 3

INVENTOR.
LUCIEN A. PETERMANN
BY Cyrus D. Samuelson
ATTORNEY

May 13, 1958 L. A. PETERMANN 2,834,158
ULTRASONIC DRILL
Filed Jan. 28, 1955 4 Sheets-Sheet 4
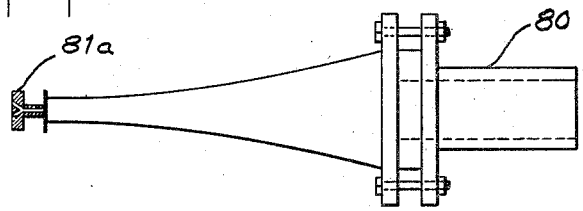
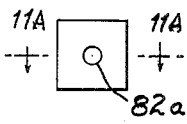
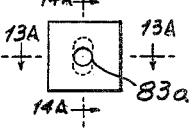
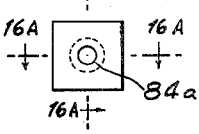
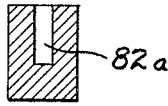
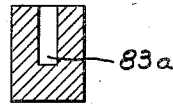
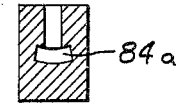
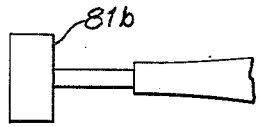
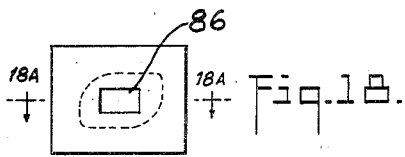
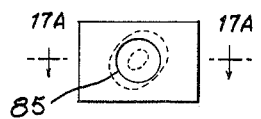
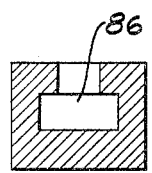
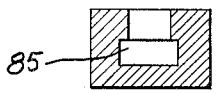
INVENTOR.
LUCIEN A. PETERMANN
BY
Cyrus D. Samuelson
ATTORNEY

United States Patent Office 2,834,158
Patented May 13, 1958

2,834,158
ULTRASONIC DRILL

Lucien A. Petermann, Metuchen, N. J., assignor to Gulton Industries, Inc., a corporation of New Jersey Application January 28, 1955, Serial No. 484,648

16 Claims. (Cl. 51—57)

My invention relates to ultrasonic drills and in particular to those which are employed by dentists and the like.

Up to the present time, ultrasonic drills have been produced which vibrate in the longitudinal modes only. So that, in order to obtain lateral movement of the tool end, which is instrumental in the cutting operation, it is necessary to move the tool end macroscopically with respect to the work surface being drilled or cut. The method has the basic disadvantage of requiring the entrance hole to be almost as large as the inner portion of the drilled hole. It is often advantageous to maintain the entrance hole as small as possible and enlarge the inner portion of the drilled hole considerably. This may be accomplished by suitable selection of tool end shapes and by the employment of a drill, produced in accordance with my invention, utilizing the flexural vibrational modes of the driving transducer.

It is, accordingly, an important object of my invention to provide a drill which is capable of enlarging the inner portion of a hole without enlarging the entry hole at the surface.

It is a further object of my invention to provide a drill which is capable of forming holes and impressions in varying shapes in hard, substantially unyielding objects.

It is a further object of my invention to provide a drill which can vibrate with three mutually perpendicular components of vibration.

Other objects and advantages of my invention will be apparent during the course of the following description.

Figure 8:
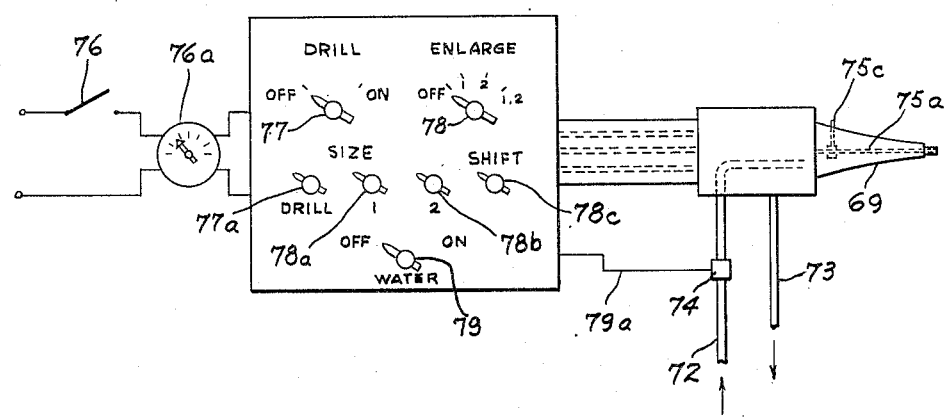
Figure 9:
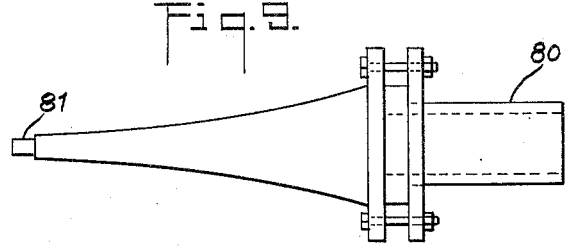

In the accompanying drawings, forming a part of this application, and in which like numerals are employed to designate like parts throughout the same, Figure 1 is a longitudinal view, partly in section, of an embodiment of my invention, Figure 2 is an end view of an ultrasonic drill, produced in accordance with my invention, illustrating the electrical connections to the electrodes and the generator, schematically, Figure 3 schematically illustrates a method of utilizing the same set of electrodes for driving the transducer of the ultrasonic drill simultaneously in the length and flexural modes, Figure 4 is a simplified plan view of an ultrasonic drill of my invention, illustrating the relationship of tool end movement to transducer vibration movement, Figure 5 is an end view of an ultrasonic drill of my invention, illustrating the electrical connections for driving the transducer and the tool end in a general flexural mode of vibration having two components of motion perpendicular to each other, Figure 6 is an end view of an ultrasonic drill of my invention, showing a method of connecting the electrodes to a single generator and associated equipment so that the combination of the two mutually perpendicular components of flexural vibration may be utilized to have the tool end described ellipses, in general, Figure 7 is a longitudinal view, partly in section, of a dentist's drill produced in accordance with my invention, Figure 8 is a schematic diagram of one embodiment of the controls and switches of the dentist's drill of Figure 7, Figure 9 is a plan view of an ultrasonic drill with a cylindrical tool end of uniform cross-section, Figures 10 through 16 illustrate various holes, which may be drilled, utilizing the tool end of Figure 9 and the various modes of vibration of the transducer, Figure 9A is a plan view of the ultrasonic drill of Figure 9 with a tool end of larger cross-section at the end than at the shank, Figures 10A through 17A and Figure 17 illustrate various holes which may be drilled, utilizing the tool end of Figure 9A and the various modes of vibration of the transducer, Figure 9B is a plan view of a rectangular tool end which may be utilized in the ultrasonic drill of Figure 9, and Figures 18 and 18A illustrate a hole which may be drilled utilizing the tool end of Figure 9B.

For purposes of illustration throughout this specification, I have described and illustrated piezoelectric transducers as the driving elements of drills produced in accordance with my invention. However, my invention is not limited to piezoelectric transducers, it being clearly understood that magnetostrictive transducers may also be employed to drive and excite drills manufactured in accordance with my invention.

Throughout this specification, I shall discuss and refer to both flexural modes of vibration. By this term, I mean the flexural mode of vibration in any two particular planes which contain the longitudinal axis of the system and are mutually perpendicular. In general, each of these two flexural modes contains the same fundamental and overtone vibrations if the transducer has symmetry of revolution about its longitudinal axis. For some, special, particular shapes, which do not possess symmetry of revolution about their longitudinal axes, the spectrum of the two mutually perpendicular flexural modes of vibration may also be the same. Therefore, any possible flexural vibration of a transducer, possessing symmetry of revolution, may be considered as a combination of fundamentals or overtones of the two flexural modes of vibration, defined above. For the purpose of simplicity, I shall refer to these flexural modes of vibration as flexural mode 1 and flexural mode 2.

In the drawings, wherein for the purpose of illustration are shown preferred embodiments of my invention, in Figure 1 the numeral 30 designates the transducer, the numeral 31 designates the tool member, the numeral 32 designates the clamps, and the numeral 33 designates the tool end.

In Figure 2, the numeral 34 designates one pair of electrodes and the numeral 35 designates the other pair of electrodes. The numeral 36 designates the ultrasonic generator, the numeral 37 designates the electrical terminals, and the numeral 37a designates the switch which is employed to change from longitudinal to flexural vibration.

In Figure 3, the numeral 38 designates the transducer, the numeral 39 designates an ultrasonic generator tuned to the frequency of the length mode of transducer 38 and the numeral 40 designates an ultrasonic generator tuned to the frequency of the flexural mode of transducer 38. The numeral 41 designates a switch for connecting and disconnecting ultrasonic generator 39 from transducer 38 and the numeral 42 designates the switch which connects and disconnects ultrasonic generator 40 from transducer 38.

Numerals 43 and 44 designate one pair of electrodes and numerals 45 and 46 designate the other pair of electrodes. Numeral 47 designates the band-pass filters for the longitudinal mode frequency of ultrasonic generator 39 and numeral 48 designates the band-pass filters for the flexural mode frequency of ultrasonic generator 40.

In Figure 4, the numeral 49 designates a transducer, the numeral 50 designates the clamps which are employed to clamp transducer 49 to tool member 51 and the numeral 52 designates the tool end.

In Figure 5, the numerals 53 through 60 designate the various electrodes applied to transducer 49, the numeral 61 designates the ultrasonic generator employed to excite flexural mode 1 of transducer 49 and the numeral 62 designates the ultrasonic generator employed to excite flexural mode 2 of transducer 49.

In Figure 6, the numeral 63 designates an ultrasonic generator utilized to excite flexural modes 1 and 2 of transducer 49, the numeral 64 designates a switch for connecting ultrasonic generator 63 to one set of electrodes and the numeral 65 designates a switch for connecting ultrasonic generator 63 to the other set of electrodes. The numeral 66 designates a phase-shifting network and attenuator which is utilized to adjust the phase of the frequency and amplitude of flexural mode 2 with respect to flexural mode 1. Phase-shifting network and attenuator 66 may be contained in a single unit as shown or may be in separate units. Or, an additional amplitude control may be used to adjust the amplitude of the signal being applied to the electrodes which excite flexural mode 1. Other methods for controlling the phase and amplitude relationship of flexural modes 1 and 2 may also be employed. It is important that these relationships be variable so that the most general shapes of holes may be obtained.

In Figure 7, the numeral 67 designates the drill housing, the numeral 68 designates the transducer, the numeral 69 designates the tool member and the numeral 70 designates the clamps which clamp 68 to 69. The numeral 71 designates the wiring cable and the numeral 71a designates the cable connector. The numeral 72 designates the cooling liquid input pipe and the numeral 73 designates the cooling liquid drain pipe. These pipes may also be included in the cable containing the leads for the electrical connections. The numeral 74 designates the valve on the cooling liquid input pipe, the numeral 75 designates the tool end, the numeral 75a designates the pipe from the cooling liquid circulation system to the tool end, and the numeral 75b designates the tool end liquid orifices. This method permits a small amount of the cooling liquid to be utilized as the abrasive carrier and to be carried directly to the work. This cooling liquid may also be applied to the work by use of a subsidiary tube or pipe. It is preferable that the orifices 75b be selected at some angle other than the direction of tool end motion so as to eliminate the possibility of leaving tips of work which have not been removed and so make the drilled hole smoother. These orifices 75b are not required if the cooling liquid is not applied to the work through the tool end 75. 75c is the control valve for the liquid flowing through 75a.

In Figure 8, the numeral 76 designates the power switch, the numeral 76a designates the power control adjustment, the numeral 77 designates the control switch for the longitudinal mode and the numeral 77a designates the longitudinal mode amplitude control. Power switch 76 and power control adjustment 76a may be located on the drill housing 67, as illustrated in Figure 7, or may be remote from drill housing 67. The numeral 78 designates the flexural mode selector switch, the numeral 78a designates the amplitude control for flexural mode 1, the numeral 78b designates the amplitude control for flexural mode 2 and the numeral 78c designates the phase-shift control. The numeral 79 designates the cooling liquid control switch and the numeral 79a designates the cooling liquid control circuit.

In Figure 9, the numeral 80 designates a transducer and the numeral 81 designates a tool end which is actuated by transducer 80 in its longitudinal and flexural modes. The numeral 82 designates the hole which will be made by tool end 81 if only the longitudinal mode of transducer 80 is excited. The numeral 83 designates the hole which will be made by tool end 81 if the longitudinal mode and one of the flexural modes of transducer 80 are excited. The numeral 84 designates the hole which will be made by tool end 81 if the longitudinal mode and flexural modes 1 and 2 of transducer 80 are excited. Hole 84, as shown, is a special case in which the amplitudes of flexural modes 1 and 2 are equal and differing in phase by 90°.

In Figure 9A, the numeral 81a designates a tool end of different shape than tool end 81 and the numeral 82a designates the hole which will be made by tool end 81a if only the longitudinal mode of transducer 80 is excited. The numeral 83a designates the hole which will be made by tool end 81a if one of the flexural modes of transducer 80 is excited after the longitudinal mode of transducer 80 has been excited. In this manner it is possible to enlarge the lower portion of the hole without making the entry larger also. If both the longitudinal and one of the flexural modes are excited simultaneously, the entry and the bottom of the hole will be of substantially the same dimensions. The numeral 84a designates the hole which will be made by tool end 81a if flexural modes 1 and 2 of transducer 80 are excited with equal amplitude and differing in phase by 90° after the longitudinal mode of transducer 80 has been excited. If the longitudinal mode and flexural modes 1 and 2 are excited simultaneously, the entry and the bottom of the hole will be of substantially the same dimensions.

In Figures 17 and 17A, the numeral 85 designates the hole which will be made by tool end 81a when flexural modes 1 and 2 of transducer 80 are excited with different amplitudes after longitudinal mode of transducer 80 has been excited.

In Figure 9B, the numeral 81b designates a rectangular tool end and the numeral 86 (Figures 18 and 18A) designates the hole which will be made when flexural modes 1 and 2 of transducer 80 are excited with unequal amplitude after the longitudinal mode of transducer 80 has been excited.

The simplified system shown in Figures 1 and 2 illustrates the theory underlying my invention. The two sets of electrodes 34 and 35 are electrically connected as shown in Figure 2 and the output of ultrasonic generator 36, to either the longitudinal mode or the flexural mode is connected to terminals 37 through two-position switch 37a. In position L, the longitudinal mode is excited and in position F, the flexural mode is excited. When the longitudinal mode is excited, the transducer 30 vibrates in the direction of transducer vibration shown by L in Figure 1 and when the flexural mode is excited, transducer 30 vibrates in the direction of transducer vibration labelled F in Figure. 1. Under these conditions of transducer excitation and vibration, tool end 33 will move in the directions of tool end movement of Figure 1 labelled L for the longitudinal mode and labelled F for the flexural mode. When a cylinder with two pairs of electrodes is excited so that the voltage applied to the first pair of electrodes is out of phase with that applied to the second pair, the portion of the cylinder between the first pair expands in thickness while that between the second pair contracts in thickness. The portion expanding in thickness decreses in length and that contracting in thickness increases in length so that there is a resulting bending or flexing of the whole cylinder. The phase difference can be accomplished by oppositely polarizing the material between the two pairs of electrodes; for example, by polarizing the portion between the first pair of electrodes from the inside toward the outside of the cylinder and polarizing the portion between the second pair of electrodes from the outside toward the inside of the cylinder and exciting both pairs of electrodes in phase.

Alternatively, the whole cylinder may be polarized in the same direction and the electrical excitation may be applied so that voltage applied to the first pair of electrodes is out of phase with the voltage applied to the second pair of electrodes. The electrodes may be bonded to the surface, reduced upon the surface or otherwise affixed to or placed in intimate contact with the surface in accordance with practices, well known in the art. In a similar manner, magnetostrictive cylindrical transducers may also be made to vibrate in flexural mode if a pair of bias windings and a pair of driving windings (excited out of phase) are employed.

One embodiment of my invention illustrating the electrical connections to the electrodes 43, 44, 45 and 46 of transducer 38 is shown in Figure 3. Ultrasonic generator 39 is tuned to the frequency of the longitudinal mode of 38 and ultrasonic generator 40 is tuned to the frequency of the flexural mode of 38. Switch 41 serves to connect the output of 39 to electrodes 43, 44, 45 and 46 and switch 42 serves to connect the output of 40 to the same electrodes. Since, in general, it is best to design the transducer 38 to have different resonant frequencies for its longitudinal and flexural modes, it is necessary to employ two generators or a generator having two distinct output frequencies which may be separately tuned and controlled in this embodiment of my invention. Band-pass filters 47 and 48 serve to isolate the two ultrasonic generators 39 and 40 and to properly apply the outputs of 39 and 40 to electrodes 43, 44, 45 and 46. 47 is a band-pass filter for the frequency of the longitudinal mode and 48 is a band-pass filter for the frequency of the flexural mode.

Figures 4 and 5 illustrate an embodiment of my invention in which flexural modes 1 and 2 are excited. When flexural mode 1 is excited, the resulting directions of transducer vibration and tool end movement marked F1 in Figure 4 are obtained and when flexural mode 2 is excited, the resulting directions of transducer vibration and tool end movement marked F2 in Figure 4 are obtained. Ultrasonic generators 61 and 62 are tuned to the resonant flexural frequencies of transducer 49, generator 61 to some frequency F1, corresponding to the vertical motion F1 shown in Figure 4, and generator 62 to some frequency F2, corresponding to the horizontal motion F2 shown in Figure 4. The generators are connected to electrodes 53, 54, 55, 56, 57, 58, 59 and 60, as shown in Figure 5. Switches for disconnecting 61 and 62 from their respective electrode groups are integral in the ultrasonic generators themselves or may be external switches in the connected circuits such as are illustrated in Figure 3 or may be a combination of both.

Figure 6 illustrates an embodiment of my invention wherein a single ultrasonic generator 63 is connected to four pairs of electrodes on the transducer 49. In the particular case illustrated, transducer 49 is a cylinder of revolution with constant thickness, having identical resonant frequencies in flexural modes in any plane containing the axis of symmetry. I have previously defined two such flexural modes which are perpendicular as flexural modes 1 and 2. Phase-shifting network and attenuator 66 serves to apply the desired difference in phase and amplitude between flexural modes 1 and 2. If only one of the switches 64 or 65 is closed, transducer 49 can be excited in one of the flexural modes 1 or 2 depending on which switch is closed. If switches 64 and 65 are both closed, the tool end attached to the transducer 49 will describe elliptical paths wherein the ratio between the lengths of the axes will be determined by the phase and amplitude differences between the exciting frequency applied to the electrodes of flexural mode 1 and that applied to the electrodes of flexural mode 2. Circles and straight lines are particular cases of the more general elliptical case.

Figure 10:
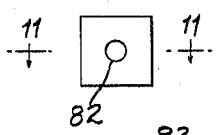
Figure 12:
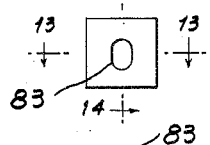
Figure 15:
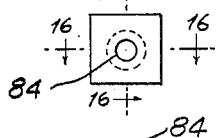
Figure 11:
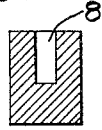
Figure 13:
Figure 16:
Figure 14:
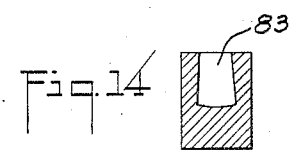

Figures 10 through 16 illustrate various hole configurations which may be obtained with the tool end 81 of Figure 9 when the longitudinal mode is combined with the flexural modes 1 and 2. Figures 10 and 11 illustrate the hole which is cut by tool end 81 when only the longitudinal mode of transducer 80 is excited. Figures 12, 13 and 14 illustrate the hole which will be cut by tool end 81 when the longitudinal mode of transducer 80 is excited and then flexural mode 1 or 2 of transducer 80 is excited after the longitudinal mode excitation has been removed. Figures 15 and 16 illustrate the hole which will be cut by tool end 81 when the longitudinal mode of transducer 80 is excited until proper hole depth is obtained and then flexural modes 1 and 2 are excited with equal amplitude and with a phase difference of 90°. If the longitudinal mode and the flexural mode or modes are excited simultaneously, the hole entry will be enlarged the same amount as the bottom of the hole.

Figures 10A through 17A and Figure 17 illustrate various hole configurations which may be obtained with the tool end 81a of Figure 9A when the longitudinal mode of excitation is combined with the flexural modes of vibration. Figures 12A, 13A and 14A illustrate hole 83a which is cut when one flexural mode of transducer 80 is excited after the hole 82a shown in Figures 10A and 11A has been previously cut by the excitation of the longitudinal mode of transducer 80 only. Figures 15A and 16A illustrate the hole 84a which is cut by tool end 81a when both flexural modes 1 and 2 are excited with the same amplitude and with a phase difference of 90° after the hole 82a shown in Figures 10A and 11A has been previously cut by excitation of the longitudinal mode of transducer 80 only. If the longitudinal and flexural modes are excited simultaneously, the hole will be of substantially the same cross-section from the top to the bottom. Figures 17 and 17A illustrate a more general case wherein hole 85 has been enlarged from hole 82a of Figures 10A and 11A by the employment of flexural modes 1 and 2 with unequal amplitudes and any phase difference not equal to zero or 90°. It is obvious to those skilled in the art that an infinite number of shapes may be obtained by this method. The use of macroscopic rotation of the drill with respect to the work and excitation of a single flexural mode of vibration will also produce some of the holes illustrated but this method is not as flexible as the employment of flexural modes 1 and 2 with variable amplitude and phase differences. The employment of flexural modes 1 and 2 in conjunction with non-symmetrical tool ends makes the production of specially shaped holes and undercuts simple and economical.

Figures 18 and 18A illustrate hole 86 which may be cut utilizing the tool end 81b of Figure 9B wherein the flexural modes 1 and 2 are excited with unequal amplitude and with a phase difference other than 90° after the hole depth has been determined by drilling with only the longitudinal mode excited. The flexural modes are not excited in this case until after the longitudinal mode excitation has been removed. If both the longitudinal mode and the flexural modes are excited simultaneously, hole 86 would be of uniform cross-section from top to bottom. It is necessary to urge the tool end toward the work in a line substantially parallel to the longitudinal axis of the drill in order to cut a hole in the work.

The tool end's axis need not be an extension of the longitudinal axis of the transducer and the tool member so that even more general holes and impressions may be cut in the work when the tool end axis is oblique to the axis of the transducer and the tool member.

Figures 7 and 8 illustrate a practical embodiment of my invention. Tool end 75 may have an abrasive tip or may be used in connection with the external application of liquid and an abrasive mixture. Figure 7 illustrates the liquid being carried from the drill housing through connection tube 75a and through orifices 75b to the work. It is preferred that the orifices not be parallel to the directions of tool end motion so that a smoother hole may be cut. When external application of liquid is employed, a tube equipped with a shut-off valve and containing the liquid-abrasive mixture may be mounted on the drill so that the liquid egress point is alongside the tool end so that the mixture is applied as close to the point of drilling as possible. If the abrasive is applied separately on the work, the water necessary for good operation may be supplied as shown in Figure 7 or may be applied externally. Valve 75c is used to regulate the flow of water in connection 75a.

Switch 76 is employed to turn the power on and off and control 76a is used to vary the input voltage applied to the drill. Cable 71 contains all the electrical wiring and is held firmly to housing 67 by cable connector 71a. The connection between housing 67 and cable connector 71a is liquid tight. Water or other suitable liquid coolant is used to cool the transducer 68 and is introduced into housing 67 through input hose 72. The excess coolant is drained out of housing 67 through pipe 73. Hose 72 and pipe 73 may be incorporated into cable 71, if desired. Valve 74, which is employed to control the flow of coolant intake into housing 67, may be a mechanical valve or may be electrically controlled by control 79 and control circuit 79a. Tool member 69 is rigidly connected to transducer 68 by means of clamps 70 or by other suitable means. The conditions to be met require that the material and dimensions of these clamps be chosen so as to achieve correct mechanical vibration of the tool end. Any holder attached to the tool must be attached at a region where the amplitude of vibration of the "free" tool is zero (nodal surface) and the boundary between the two clamped pieces (transducer and tool member) must be such that there is no discontinuity of stress or displacement through this boundary during the vibrations.

All controls illustrated in Figure 8 are located so as to be convenient to the user. Switch 77 turns the longitudinal mode on or off and control 77a controls the amplitude of the longitudinal mode. Switch 78 selects neither, either or both of the flexural modes 1 and 2. Control 78a controls the amplitude of flexural mode 1, control 78b controls the amplitude of flexural mode 2 and control 78c controls the phase of flexural mode 2 with respect to flexural mode 1. Control 79 controls the coolant input valve 74 through control circuit 79a.

While I have described my invention by means of specific examples and in specific embodiments, I do not wish to be limited thereto, for obvious modifications will occur to those skilled in the art without departing from the spirit of the invention or the scope of the subjoined claims.

Having thus described my invention, I claim:

1. An ultrasonic drill for removing material from a hard substantially non-yielding object comprising a transducer having a tool member connected thereto and suitable electrodes affixed to the surfaces of said transducer; said electrodes being electrically connected to means for exciting said transducer such that the end of said tool member will vibrate in at least two modes with respect to the major axis of said tool member; means for urging said transducer and object toward each other along a line substantially parallel to the longitudinal axis of the tool member and means for applying abrasive particles in liquid suspension between the tool member and the object such that said abrasive particles are driven against said object to remove material therefrom.

2. An ultrasonic drill as described in claim 1 wherein the means for exciting said transducer vibrate said tool member in a mode of vibration substantially perpendicular to the major axis of said tool member.

3. An ultrasonic drill as described in claim 1 wherein the means for exciting said transducer vibrate said tool member in one mode of vibration substantially perpendicular to the major axis of said tool member and in one mode of vibration substantially parallel to the major axis of said tool member.

4. An ultrasonic drill as described in claim 1 wherein said means for exciting said transducer vibrate said tool member in two modes of vibration substantially perpendicular to the major axis of the tool member and to each other.

5. An ultrasonic drill as described in claim 1 wherein said means for exciting said transducer vibrate said tool member in one mode of vibration substantially parallel to the major axis of said tool member and in two modes of vibration substantially perpendicular to the major axis of said tool member and to each other.

6. An ultrasonic drill as described in claim 1 wherein the said means for exciting said transducer vibrate said tool member in three mutually perpendicular modes of vibration.

7. An ultrasonic drill for removing material from a hard substantially non-yielding object comprising a transducer having a tool member connected thereto and electrical windings wound around the surfaces of said transducer; said windings being electrically connected to means for exciting said transducer such that the end of said tool member will vibrate in at least two modes with respect to the major axis of said tool member; means for urging said transducer and object toward each other along a line substantially parallel to the longitudinal axis of the tool member and means for applying abrasive particles in liquid suspension between the tool member and the object such that said abrasive particles are driven against said object to remove material therefrom.

8. An ultrasonic drill as described in claim 7 wherein the means for exciting said transducer vibrate said tool member in a mode of vibration substantially perpendicular to the major axis of said tool member.

9. An ultrasonic drill as described in claim 7 wherein the means for exciting said transducer vibrate said tool member in one mode of vibration substantially perpendicular to the major axis of said tool member and in one mode of vibration substantially parallel to the major axis of said tool member.

10. An ultrasonic drill as described in claim 7 wherein said means for exciting said transducer vibrate said tool member in two modes of vibration substantially perpendicular to the major axis of the tool member and to each other.

11. An ultrasonic drill as described in claim 7 wherein said means for exciting said transducer vibrate said tool member in one mode of vibration substantially parallel to the major axis of said tool member and in two modes of vibration substantially perpendicular to the major axis of said tool member and to each other.

12. An ultrasonic drill as described in claim 7 wherein the said means for exciting said transducer vibrate said tool member in three mutually perpendicular modes of vibration.

13. The method of removing material from a hard substantially non-yielding object which comprises applying a tool end to the object to be treated, interposing between the tool end and the object an abrasive liquid solution, producing at the area of contact an oscillation of high frequency and small amplitude having a major component of movement along the longitudinal axis of said tool end and advancing the tool end into the object as the abrasive progressively removes material from the object at the area of contact; upon reaching the desired depth of material removal, removing said high frequency oscillation having a major component along the longitudinal axis of said tool end and producing at the area of contact an oscillation of high frequency and small amplitude having a major component of movement perpendicular to the longitudinal axis of said tool end.

14. The method of removing material from a hard substantially non-yielding object which comprises applying a tool end to the object to be treated, interposing between the tool end and the object an abrasive liquid solution, producing at the area of contact an oscillation of high frequency and small amplitude having two major components of movement, one along the longitudinal axis of said tool end and the other perpendicular to the longitudinal axis of said tool end, and advancing the tool end into the object as the abrasive progressively removes material from the object at the area of contact.

15. The method of removing material from a hard substantially non-yielding object which comprises applying a tool end to the object to be treated, interposing between the tool end and the object an abrasive liquid solution, producing at the area of contact an oscillation of high frequency and small amplitude having three mutually perpendicular major components of movement, one of which is along the longitudinal axis of said tool end, and advancing the tool end into the object as the abrasive progressively removes material from the object at the area of contact.

16. The method of removing material from a hard substantially non-yielding object which comprises applying a tool end to the object to be treated, interposing between the tool end and the object an abrasive liquid solution, producing at the area of contact an oscillation of high frequency and small amplitude having a major component of movement along the longitudinal axis of said tool end and advancing the tool end into the object as the abrasive progressively removes material from the object at the area of contact; upon reaching the desired depth of material removal, removing said high frequency oscillation having a major component along the longitudinal axis of said tool end and producing at the area of contact an oscillation of high frequency and small amplitude having at least two major components of movement perpendicular to the longitudinal axis of said tool end.

References Cited in the file of this patent

UNITED STATES PATENTS

| | | |
|---|---|---|
| 1,796,650 | Harrison | Mar. 17, 1931 |
| 1,882,399 | Pierce | Oct. 11, 1932 |
| 2,460,919 | Bodine | Feb. 8, 1949 |
| 2,504,831 | Griss | Apr. 18, 1950 |
| 2,580,716 | Balamuth | Jan. 1, 1952 |
| 2,616,223 | Jonker | Nov. 4, 1952 |
| 2,702,691 | Virmoni | Feb. 22, 1955 |
| 2,736,144 | Thatcher | Feb. 28, 1956 |

FOREIGN PATENTS

| | | |
|---|---|---|
| 671,141 | Germany | Feb. 2, 1939 |